United States Patent
Kasazumi et al.

(10) Patent No.: US 6,958,967 B2
(45) Date of Patent: Oct. 25, 2005

(54) HOLOGRAPHIC OPTICAL INFORMATION RECORDING/REPRODUCING DEVICE

(75) Inventors: Ken'ichi Kasazumi, Osaka (JP); Yasuo Kitaoka, Osaka (JP); Kazuhisa Yamamoto, Osaka (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 473 days.

(21) Appl. No.: 09/993,198

(22) Filed: Nov. 14, 2001

(65) Prior Publication Data

US 2002/0075776 A1 Jun. 20, 2002

(30) Foreign Application Priority Data

Nov. 17, 2000 (JP) .................................... 2000-351308

(51) Int. Cl.[7] .............................................. G11B 7/24
(52) U.S. Cl. .................................. 369/103; 369/109.01
(58) Field of Search .............................. 369/103, 108, 369/109.01

(56) References Cited

U.S. PATENT DOCUMENTS

| | | | | |
|---|---|---|---|---|
| 5,191,574 A | * | 3/1993 | Henshaw et al. | 369/100 |
| 5,319,629 A | * | 6/1994 | Henshaw et al. | 369/103 |
| 5,777,760 A | * | 7/1998 | Hays et al. | 359/7 |
| 5,822,090 A | * | 10/1998 | Wilde | 359/7 |
| 5,835,650 A | * | 11/1998 | Kitaoka et al. | 385/49 |
| 5,940,514 A | * | 8/1999 | Heanue et al. | 713/193 |
| 6,061,154 A | * | 5/2000 | Campbell et al. | 359/32 |
| 6,088,321 A | * | 7/2000 | Yamaji et al. | 369/103 |
| 6,281,993 B1 | * | 8/2001 | Bernal et al. | 359/29 |

FOREIGN PATENT DOCUMENTS

| | | |
|---|---|---|
| EP | 1065658 | 1/2001 |
| JP | 5-165388 | 7/1993 |
| JP | 11-16374 | 1/1999 |

OTHER PUBLICATIONS

1991, Yamamoto et al. "Milliwatt–order blue–light generation in a periodically domain–inverted liTaO$_3$ waveguide" Optics Letters, vol. 16, No 15, pp 1156–1158.
1997, Gulgazov et al. "Tunable high–power AlGaAs distributed Bragg reflector laser diodes" Electronics Letters, vol. 33, No 1, pp 58–59.
1979, Nakayama et al. "Diffuser with pseudorandom phase sequence" J. Opt. Soc. Am., vol. 69, No 10, pp1367–1372.

* cited by examiner

Primary Examiner—Brian E. Miller
Assistant Examiner—Michael V. Battaglia
(74) Attorney, Agent, or Firm—Hamre, Schumann, Mueller & Larson, P.C.

(57) ABSTRACT

An optical information recording/reproducing device reproduces digital data recorded in a form of interference fringes produced by two coherent beams in a hologram disk, by projecting a coherent beam to the hologram disk and receiving a reproduction signal beam obtained by diffraction by means of a two-dimensional photodetector array. The holographic optical information recording/reproducing device includes a tunable coherent light source that emits the coherent beam, and a control section controls and optimizes a wavelength of the tunable coherent light source according to position information of the reproduction signal beam on the two-dimensional photodetector array. Thus, a holographic optical information recording/reproducing device is provided that is capable of maintaining a sufficient reproduction signal intensity and reproducing signals stably while undergoing a minimum of cross-talk, even in the case where the optimal reproduction wavelength varies due to a variance of media, a change of a temperature of a recording medium, etc.

10 Claims, 13 Drawing Sheets

HOLOGRAPHIC OPTICAL INFORMATION RECORDING/REPRODUCING DEVICE

BACKGROUND OF THE INVENTION

1. Field of the Invention

The present invention relates generally to a holographic optical information recording/reproducing device, for recording/reproducing information at a high density using an optical recording medium having a hologram medium. Herein, the "recording/reproducing" refers to an apparatus or method capable of carrying out one or both functions for the purpose of the present invention.

2. Related Background Art

A compact disk (CD) has enabled the recording of music data for 74 minutes and the recording of digital data of 640 megabytes (MB) by means of a light source with a wavelength of 780 nm and an objective lens with a numerical aperture of 0.45. A digital versatile disk (DVD) has enabled the recording of moving pictures of MPEG 2 for two hours and fifteen minutes, and the recording of digital data of 4.7 gigabytes (GB) by means of a light source with a wavelength of 650 nm and an objective lens with a numerical aperture of 0.6. Recently, the high-definition moving picture broadcasting using not less than 1000 horizontal scanning lines, which provides high horizontal resolution, has been started, while personal computers have had higher performances. These have caused the expectations for higher-density and larger-capacity optical disk to rise further. Meanwhile, an optical disk system in which a light source with a wavelength of around 400 nm and an objective lens with a numerical aperture of 0.85 are combined has been proposed, whereby a capacity of more than 20 GB on one side is about to be provided.

Thus, the densification of optical disk devices has been achieved by utilizing an optical source with a shorter wavelength and an objective lens with a greater numerical aperture. However, such an approach as above using a shorter wavelength and a lens with a greater numerical aperture is about to reach its limit. More specifically, in a wavelength range of not higher than 400 nm, the wavelength dispersion of a glass material used in a lens increases, and this makes it difficult to control an aberration of the same. In the case where a solid immersion lens technique that has been developed to increase the numerical aperture is used, a lens working distance is very short (about 50 nm), which makes the changing of disks difficult. To overcome these problems and to achieve higher-densification, the holographic recording technique has attracted keen attention.

A typical example is an optical-disk optical system of the shift-multiplexing recording scheme proposed by Psaltis et al., a schematic configuration of which is shown in FIG. 14. Light from a laser light source 1 is split by a half mirror 8 after its beam diameter is expanded by a beam expander 7. One of the beams obtained by division, whose traveling direction is changed by a mirror 10, passes through a spatial light modulator 2, and is focused into a hologram disk 5 by a Fourier-transform lens 3, where it is converted into a signal beam. The other beam is converged by an objective lens 12 to become a reference beam 22, and irradiates the same position on the hologram disk 5 as that irradiated with the signal beam. The hologram disk 5 is composed of two glass substrates and a hologram medium such as photopolymer provided and sealed therebetween, so that interference fringes produced by the signal beam and the reference beam are recorded.

The spatial light modulator 2 is composed of an optical switch array in which optical switches are arrayed planarly, and the respective optical switches are turned ON/OFF independently according to input signals 23 to be recorded. For instance, in the case where a 1024 cells×1024 cells spatial light modulator 2 is used, information of 1 Mbit can be displayed at once. When signal light passes the spatial light modulator 2, the 1Mbit information displayed on the spatial light modulator 2 is converted into a two-dimensional light beam array and recorded as interference fringes in the hologram disk 5. Upon reproduction of the recorded signals, the hologram disk 5 is irradiated with only the reference beam 22, and a reproduction signal beam 21 as diffracted light from the hologram is passed through a Fourier transform lens 4 and received by a photodetector 6, whereby a reproduction signal 24 is detected.

The optical recording system shown in FIG. 14 is characterized in that the hologram medium is thick, approximately 1 mm, and the interference fringes are recorded as a grating with thick interference fringes, that is, a Bragg grating, thereby enabling angle-multiplexing recording. Thus, a large-capacity optical recording system is provided. In the system shown in FIG. 14, the angle multiplexing is provided by shifting a position irradiated with a spherical wave reference beam, instead of an angle of incidence of the reference beam 22. In other words, slight changes in angles of incidence of the reference beam are utilized that are sensed by respective portions of the medium when a recording position is shifted by slightly rotating the hologram disk 5. When the hologram medium has a thickness of 1 mm, the wavelength selectivity specified according to the reproduction signal intensity has a full width at half maximum (FWHM) of 0.014 degree. With the numerical aperture for the reference beam of 0.5 and the hologram size of 2 mm$\phi$, the recording of multiplexed holograms at intervals of approximately 20 $\mu$m results in a recording density of 600 Gbit/inch$^2$, which provides a capacity of 730 GB in the case of a 12-cm disk.

A key to providing a high-density optical recording/reproducing system as described above is a compact and stable laser light source. Particularly, because the Bragg grating has wavelength selectivity as well as angle selectivity, it is necessary to control the wavelength of the light source in recording and reproducing operations, and hence, it is impossible to use a semiconductor laser like that used with a normal optical disk. Besides, though a light source with a short wavelength preferably is used from the viewpoint of recording density, green light of an Ar laser that provides high power at relatively lower costs often is used in experiments. Furthermore, recently, a second-harmonic light source of Nd-doped YAG laser, which can be provided in a completely solid form, is used for achieving compactness.

As described above, in the hologram recording utilizing the Bragg grating, recorded diffraction patterns vary according to incidence directions and wavelengths of light. Therefore, in the case where wavelengths upon recording and reproducing operations are different from each other, this causes an increase in cross-talk signals, a decrease in signal light intensities, and the like. Besides, a change in a temperature of the recording medium causes a change in an optical reproduction wavelength, and this also causes an increase in cross-talk signals, a decrease in signal light intensities, and the like.

In the case of the optical disk of FIG. 14, information is reproduced as Bragg diffracted light from recorded interference fringes. In order that reproduction is carried out with a reproduction signal beam having a sufficient light quantity, it is necessary to satisfy the Bragg condition. In other words, the angle of incidence of the reference beam to the medium and the wavelength of the reference beam need to be optimized.

For instance, assuming a system having a hologram medium with a thickness of 1 mm, a light source wavelength of 515 nm, and an interference fringe cycle of 0.5 $\mu$m, an allowable range of the Bragg condition with respect to the reference beam wavelength, which is defined with a value of a wavelength at which the diffraction effect is reduced in half, is 515 nm±0.24 nm. In the case of the configuration of FIG. 14, it is necessary to take thermal expansion of the hologram medium into consideration. This is because the thermal expansion of the hologram medium causes a change in the cycle of the recorded interference fringes, which causes a change in the optimal reproduction wavelength that satisfies the Bragg condition.

The following description will depict an example in which a photopolymer, OmniDex 352 produced by Du Pont, is used. Its thermal expansion coefficient is measured to be $7.1 \times 10^{-5}$ (Ueda et al., JP5(1993)-165388A), and a change in the optimal wavelength with respect to a temperature change of 25° C. is 0.18%, and 515+0.9 nm in terms of an oscillation wavelength of argon laser. The change in wavelength is more than three times of the tolerance of the foregoing allowable range of the Bragg condition, 515±0.24 nm, and to stably reproduce holograms against a temperature change of 25° C., it is necessary to optimize the wavelength of the reproduction light source according to a temperature change during reproduction.

SUMMARY OF THE INVENTION

Therefore, it is an object of the present invention to solve the foregoing problems to provide a holographic optical information recording/reproducing device that is capable of maintaining a sufficient reproduction signal intensity and reproducing signals stably while undergoing a minimum of cross-talk, even in the case where signals are reproduced from media having different optimal reproduction wavelengths, as well as in the case where the optimal reproduction wavelength varies due to a change of a temperature of a recording medium.

To reproduce digital data recorded in a form of interference fringes produced by two coherent beams in a recording medium, a holographic optical information recording/reproducing device of the present invention projects a coherent beam to the recording medium and receives a reproduction signal beam obtained by diffraction at the recording medium by means of a two-dimensional photodetector array. To solve the aforementioned problems, the holographic optical information recording/reproducing device includes a tunable coherent light source that emits the coherent beam, and a control section that reads position information of the reproduction signal beam on the two-dimensional photodetector array, and controls a wavelength of the tunable coherent light source according to the position information.

In the foregoing configuration, it is preferable that at least one of photoreceptor cells of the two-dimensional photodetector array is divided into not less than two regions, at least a part of the reproduction signal beam is used as a servo-use beam, and an optical system is disposed so that in a normal state, the servo-use beam is made incident, for instance, on a border between the regions of the divided photoreceptor cell. Furthermore, the control section detects a differential signal derived from signals obtained from the respective regions of the divided photoreceptor cell, and controls the wavelength of the tunable coherent light source according to the differential signal.

In any one of the foregoing configurations, preferably, the optical system is arranged so that the coherent beam passes through an anamorphic optical system, and the control section detects a position deviation of the coherent beam in a focusing direction and a wavelength deviation of the tunable coherent light source independently, according to changes in a reproduced image detected by the two-dimensional photodetector array.

In any one of the foregoing configurations, preferably, the holographic optical information recording/reproducing device includes a beam splitter for dividing the coherent beam emitted from the tunable coherent light source into two beams that are a signal beam and a reference beam, a spatial light modulator for modulating an intensity of the signal beam two-dimensionally, an element for imparting a two-dimensional phase distribution to the signal beam on the spatial light modulator, and an optical system for crossing the signal beam and the reference beam on the recording medium. In a periphery of the element for imparting a two-dimensional phase distribution, a region in which a coherence length is greater than that in its central region is provided.

In the foregoing configuration, preferably, the element for imparting a two-dimensional phase distribution includes cells that are arranged in a two-dimensional square grid and that have phase shifts of any one of 0, $\pi/2$, $\pi$, and $3\pi/2$, and a phase difference between adjacent cells is either $\pi/2$ or $3\pi/2$.

In any one of the aforementioned configurations, preferably, the holographic optical information recording/reproducing device further includes a lens system for focusing diffracted light from the recording medium into the two-dimensional photodetector array, and the recording medium is disposed at a position different from a focus of the lens system.

In any one of the aforementioned configurations, preferably, the recording is carried out so that the servo-use beam of the reproduction signal beam is in an ON state, either constantly or at a higher probability as compared with the other beam spots.

Furthermore, in any one of the foregoing configurations, the tunable coherent light source preferably is a coherent light source utilizing a tunable semiconductor laser and a second-harmonic generation element.

Furthermore, in any one of the aforementioned configurations, the divided photoreceptor cells preferably are positioned at four corners of the two-dimensional photodetector array.

BRIEF DESCRIPTION OF THE DRAWINGS

FIG. 7A is a cross-sectional view taken along a plane perpendicular to a plane containing a direction of a reference beam and a main diffraction direction, and FIG. 7B is a cross-sectional view taken along a plane containing the direction of the reference beam and the main diffraction direction.

FIG. 10A is a cross-sectional view taken along a plane perpendicular to the main diffraction direction, and FIG. 10B is a cross-sectional view taken along a plane parallel with the main diffraction direction.

DETAILED DESCRIPTION OF THE INVENTION

First Embodiment

Figure 1:
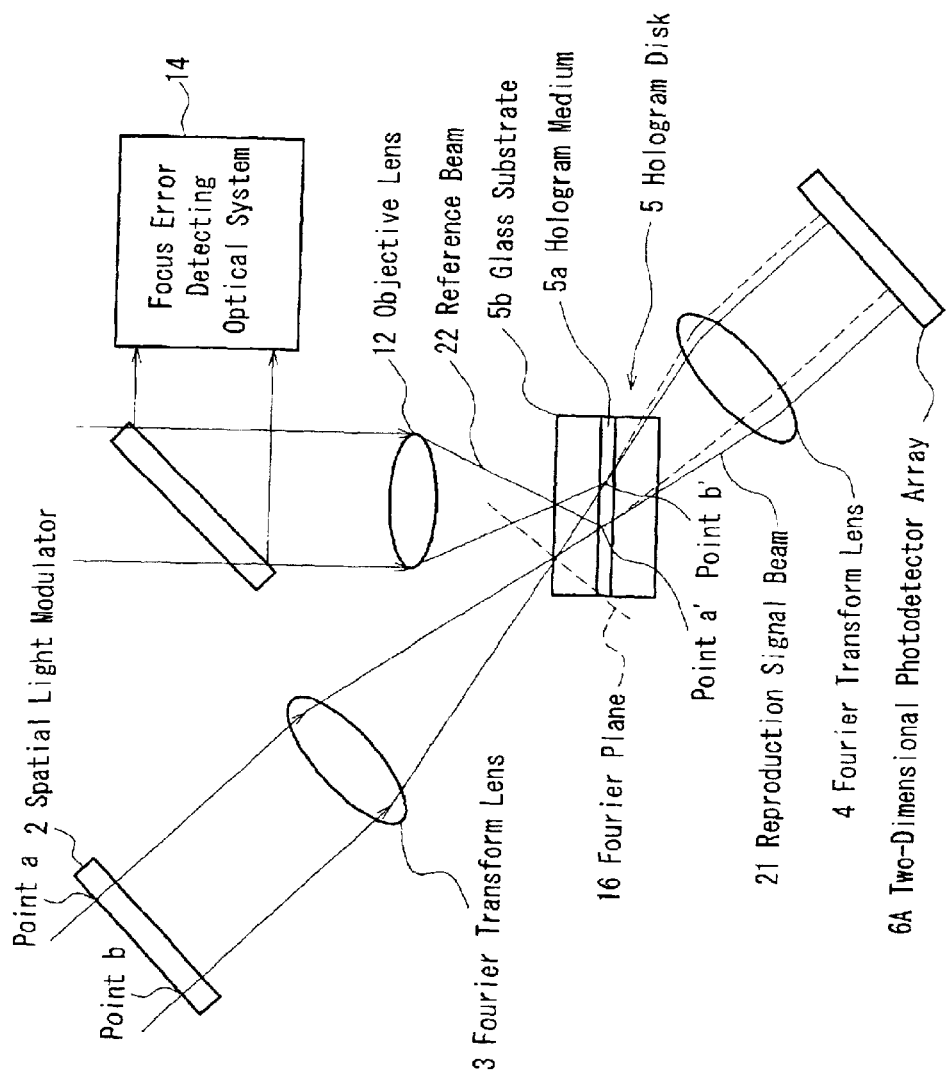
FIG. 1 is a view illustrating a schematic configuration of a holographic optical information recording/reproducing device according to a first embodiment of the present invention.
Figure 2:
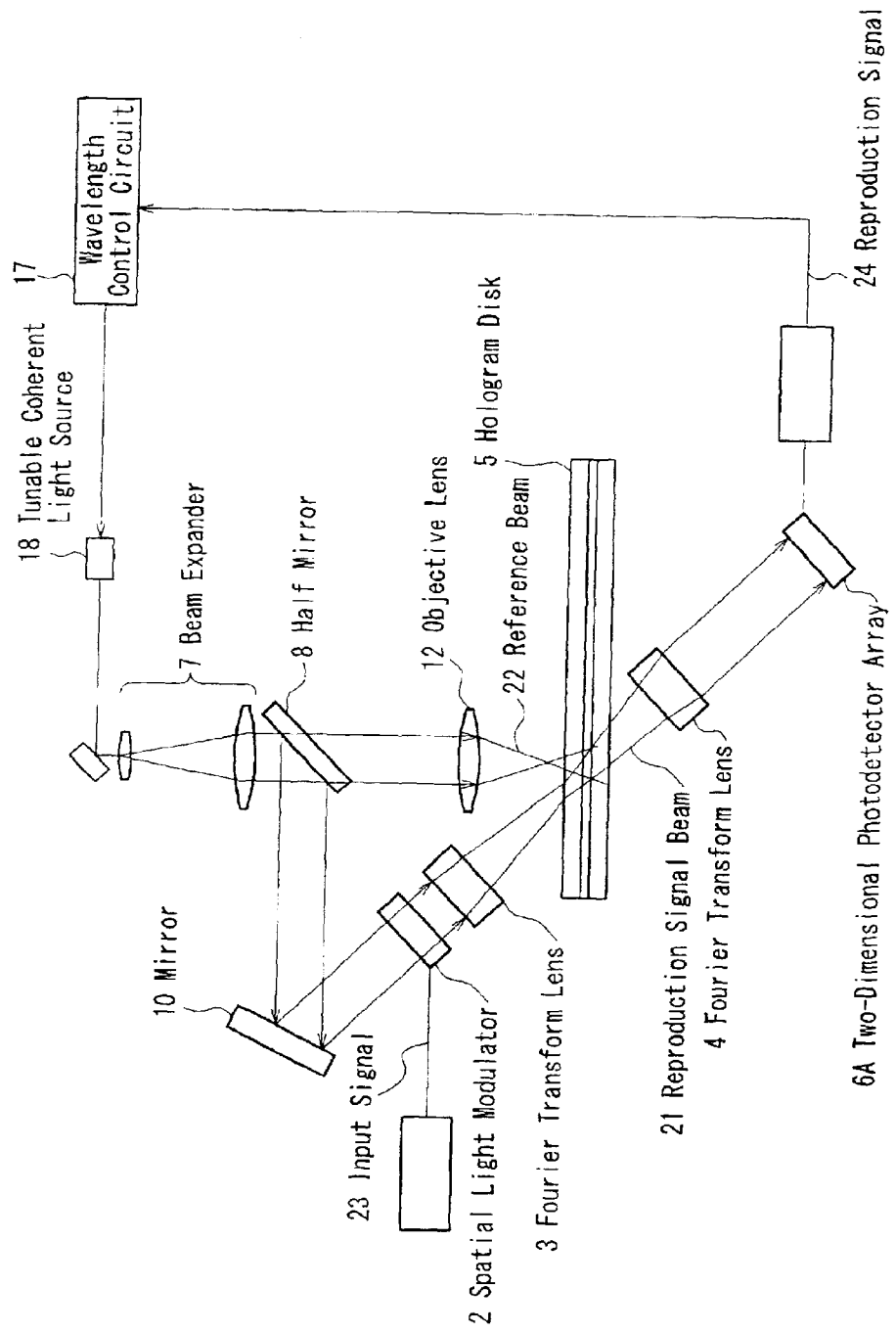
FIG. 2 is a view illustrating an overall configuration of the holographic optical information recording/reproducing device according to the first embodiment of the present invention.

FIG. 1 is a view illustrating a schematic configuration of principal parts of an optical information recording/reproducing device according to a first embodiment, centering around a reproducing optical system in which diffracted light from a hologram disk 5 as a recording medium irradiates a two-dimensional photodetector array 6A. An overall configuration of the optical information recording/reproducing device is as shown in FIG. 2. It should be noted that the same elements as those of the conventional optical information recording/reproducing device shown in FIG. 14 will be designated by the same reference numerals.

FIG. 1 illustrates that the hologram disk 5 is composed of two glass substrates 5b, and a hologram medium 5a such as a photopolymer interposed therebetween. A spherical wave reference beam 22 is focused by an objective lens 12 on a surface of the glass substrates 5b encapsulating the hologram medium 5a. Apart of the beam returns to a focus error detecting optical system 14 by Fresnel reflection at the surface of the glass substrates 5b. The objective lens 12 that converges the reference beam 22 is subjected to control of its optical axis direction position according to a focus error signal outputted from the focus error detecting optical system 14, so that the reference beam 22 is focused always onto the surface of the glass substrates 5b.

In the hologram medium 5a, two-dimensional data displayed on a spatial light modulator 2 are recorded in a form of interference fringes of light. More specifically, a signal beam having two-dimensional bright/dark patterns according to data to be recorded by the spatial light modulator 2 interferes with the reference beam 22, whereby fine interference patterns on a wavelength order, that is, holograms, are produced and recorded in the hologram medium 5a. The hologram normally has a circular shape with a diameter of several millimeters, and one hologram represents an entirety of data displayed on the spatial light modulator 2 at once. By recording many holograms at different positions in a hologram medium, a large-capacity recording medium is provided. The hologram medium 5a is in a disk form, a rectangular card form, etc., and for either, the recording/reproduction is carried out by selecting different holograms as the disk is rotated or as the card is translated.

When entering the hologram medium 5a, the reference beam 22 is diffracted by holograms recorded in the hologram medium 5a, to generate a reproduction signal beam 21. In the reproduction signal beam 21, two-dimensional bright/dark patterns that the signal beam possessed when the holograms were recorded are reproduced. The reproduction signal beam 21 passes through a Fourier transform lens 4 and is received by a two-dimensional photodetector array 6A, where reproduction signals are detected. The two-dimensional photodetector array 6A includes a two-dimensional photoreceptor cell array that corresponds to a two-dimensional pattern of the reproduction signal, which may be formed with, for instance, a PD array, a CCD element, or a CMOS element. Normally, the photoreceptor cells are arrayed in the two-dimensional photodetector array 6A so as to have a one-to-one correspondence with respect to optical switches that are arrayed two-dimensionally in the spatial light modulator 2. Alternatively, however, they may be arrayed so that a plurality of photoreceptor cells correspond to one cell of the spatial light modulator 2. In the latter case, it is necessary to subject output signals of the two-dimensional photodetector array 6A to image processing, whereby an effect of suppression of cross-talk between cells can be achieved.

The reproduction signal beam 21 herein generated travels the same route that a signal beam modulated by the spatial light modulator 2 upon recording travels. This characterizes the hologram recording/reproduction. In the case where the hologram medium 5a is positioned on a Fourier plane 16 of the Fourier transform lens 3, a beam having passed through any cell in the spatial light modulator 2 irradiates the same point on the hologram medium 5a. The optical information recording/reproducing device having the configuration shown in FIG. 1 is characterized in that the hologram medium 5a is positioned at a certain distance from the Fourier plane 16. Here, as shown in the drawing, beams having passed through a point a and a point b that are different points on the spatial light modulator 2 pass through different points (point a' and point b', respectively) on the hologram medium 5a. Since a spherical wave is used for the reference beam 22, at different points on the hologram medium 5a, the reference beam 22 enters the hologram medium 5a with different angles of incidence, and upon reproduction, the reproduction signal beam 21 is given with different diffraction angles at different points on the hologram medium 5a.

In FIG. 1, the reproduction signal beam 21 upon reproduction with use of the reference beam 22 having an optimal wavelength is indicated with solid lines, and the reproduction signal beam 21 upon reproduction with the reference beam 22 having a wavelength that is deviated from the optimal wavelength to be longer than the same is indicated with broken lines. As shown in the drawing, in the case where the wavelength increases, the diffraction angle increases, thereby causing the reproduction signal beam 21 to irradiate a different position on the two-dimensional photodetector array 6A. Here, in the case where the wavelength increases, the reproduction signal beam 21 generally shifts in the right upward direction as viewed in the drawing, and irradiates a narrower region. As to such a shift of the entire beam, the position is controlled by translating the two-dimensional photodetector array 6A within the plane of the photodetector elements thereof, following the beam shift.

Figure 3:
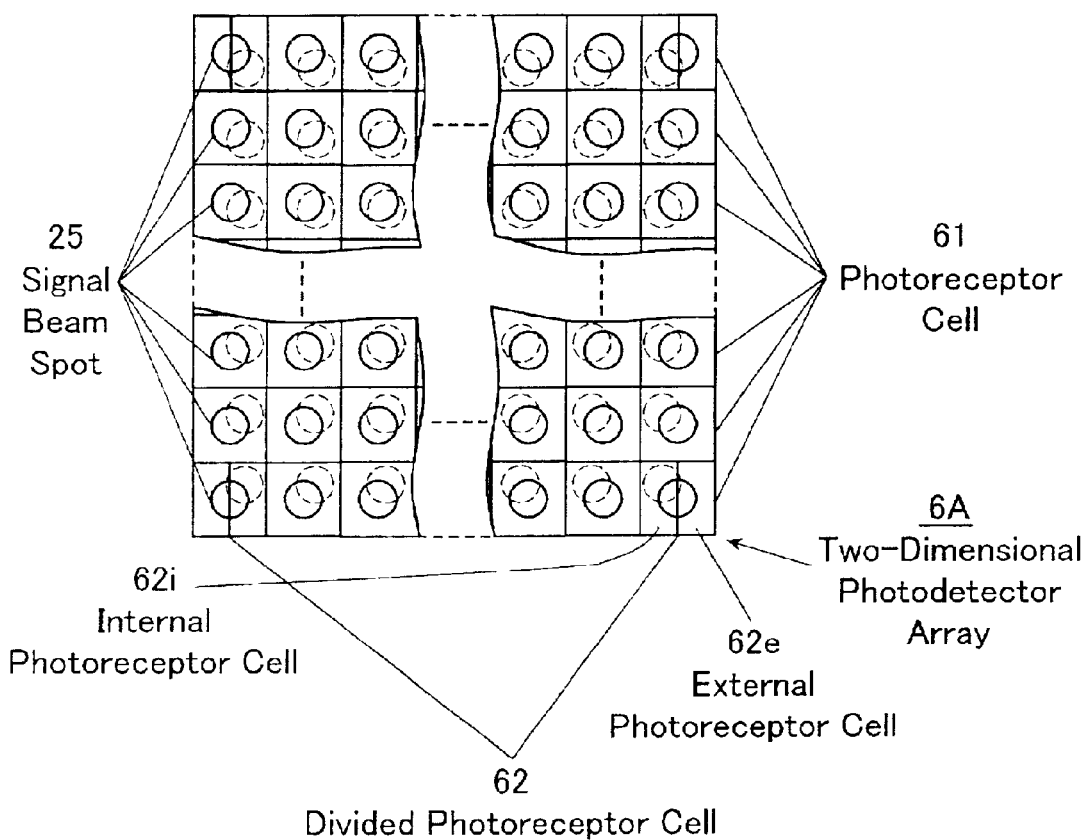
FIG. 3 is a view illustrating an example of a configuration of a two-dimensional photodetector array in the foregoing holographic optical information recording/reproducing device, along with a received light pattern thereof.

A schematic plan view of the two-dimensional photodetector array 6A receiving the reproduction signal beam 21 is shown in FIG. 3. The two-dimensional photodetector array 6A is composed of a group of photoreceptor cells 61 that are arrayed in a grid. In the photoreceptor cell group, photoreceptor cells provided at four corners are divided photoreceptor cells 62, each of which is divided in half, into an internal photoreceptor cell 62i and an external photoreceptor cell 62e. As to each of the photoreceptors 61 and 62, a signal beam spot 25 incident thereon is shown. A position of the signal beam spot 25 upon reproduction with an optimal wavelength is indicated with a circle of a solid line, while a position of the signal beam spot 25 upon reproduction with a longer wavelength than the optimal wavelength is indicated with a circle of a broken line. The signal beam spot 25 falling on the divided photoreceptor cell 62, which is indicated with the broken-line circle, causes a signal outputted from the internal photoreceptor cell 62i and a signal outputted from the external photoreceptor cell 62e to satisfy the relationship of (output of the internal photoreceptor cell 62i)>(output of the external photoreceptor cell 62e), and a differential signal derived from the two outputs permits detection of a deviation of the wavelength. It should be noted that in the case where reproduction is carried out with light having a shorter wavelength than the optimal wavelength, respective positions of the signal beam spots 25 in the photoreceptor cells 61 shift from the positions indicated with the solid-line circles in the opposite direction of the direction toward the positions indicated with the broken-line circles.

Furthermore, as seen from FIG. 3, a change of the position of the signal beam spot 25 due to a deviation of the light source wavelength is greater in the periphery, and smaller in the center, of the two-dimensional photodetector array 6A. Therefore, to detect a deviation of the light source wavelength with high sensitivity, it is effective to detect a beam position by means of divided cells provided in the peripheral parts of the two-dimensional photodetector array 6A. A configuration as shown in FIG. 3, in which divided cells are provided at four corners of the two-dimensional photodetector array 6A, is preferable particularly from the advantage that the detection sensitivity is maximized.

Normally, the beam for recording data is switched between the ON state and the OFF state as to each hologram. To carry out the beam position detection speedily and accurately, the recording preferably is carried out in a manner such that respective signal beam spots 25 for the position detection that irradiate cells in the periphery of the two-dimensional photodetector array 6A are in the ON state with respect to all the holograms. However, in the case where the signal beam spots 25 irradiating the cells used for the position detection are set so that all of the same are in the ON state, this means that the foregoing signal beam spots 25 are used only for the position detection, and a substantial information quantity for recording data decreases. Therefore, in order not to decrease the substantial information quantity for recording data, holograms may be given with address information, by an encoding scheme that increases a probability that the signal beam spots 25 irradiating the cells for the position detection are turned ON.

Figure 4:
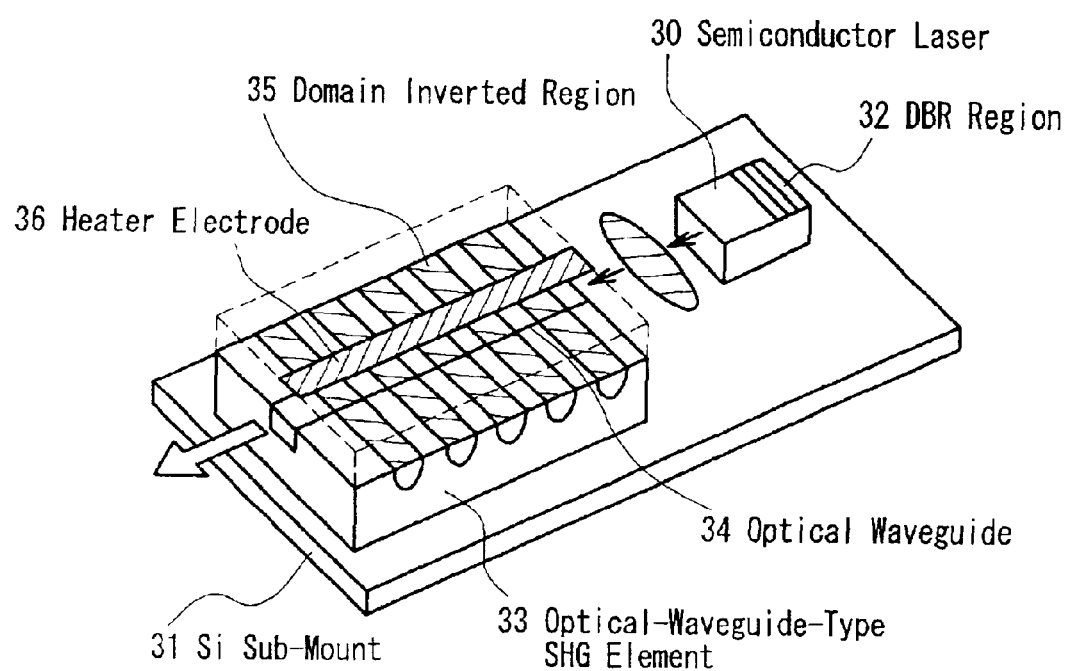
FIG. 4 is a perspective view illustrating a schematic configuration of an optical-waveguide-type second harmonic generation laser light source.
Figure 14:
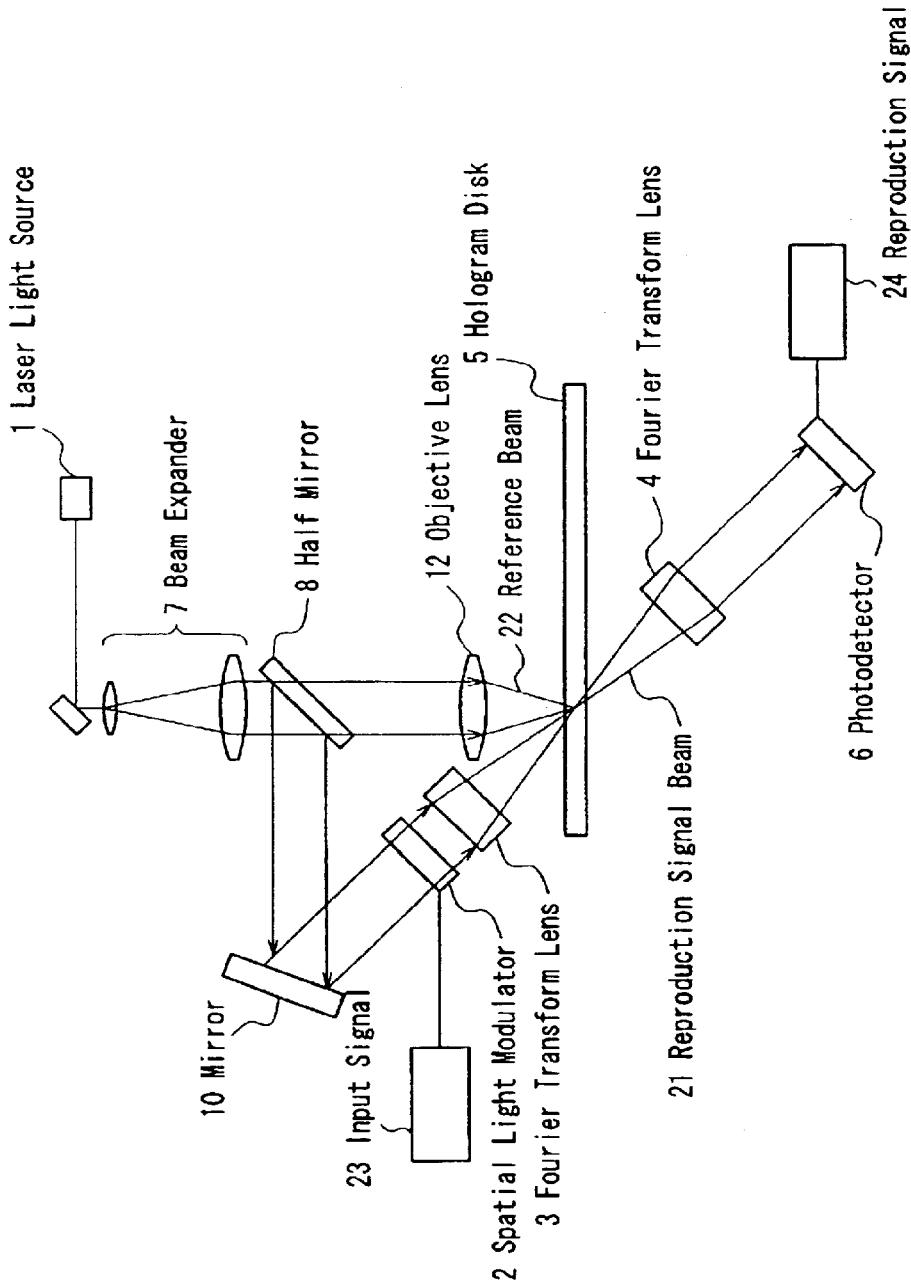
FIG. 14 is a view illustrating a schematic configuration of a conventional holographic optical information recording/reproducing device.

As shown in FIG. 1, in the present embodiment, a tunable coherent light source 18 is used instead of the laser light source 1 shown in FIG. 14. The tunable coherent light source 18 is provided readily by utilizing, for instance, a semiconductor laser and, as an optical-waveguide-type wavelength converting device, for instance, an optical-waveguide-type second harmonic generation element (hereinafter referred to as SHG) of a quasi-phase-matching (hereinafter referred to as QPM) type (Yamamoto et al., Optics Letters Vol. 16, No. 15, 1156 (1991)). FIG. 4 illustrates a schematic configuration of the tunable coherent light source 18 including an optical-waveguide-type SHG element 33 and a semiconductor laser 30 that are mounted on a Si sub-mount 31.

As the semiconductor laser 30, a tunable distributed Bragg reflector (hereinafter referred to as DBR) semiconductor laser having an activated layer region and DBR regions 32 may be used. The semiconductor laser 30 may be a 100 mW-class AlGaAs-type tunable DBR semiconductor laser of a 0.85 $\mu$m band (see V. N. Gulgazov, H. Zhao, D. Nam, J. S. Major Jr., and T. L. Koch: "Tunable high-power AlGaAs distributed Bragg reflector laser diodes", Electron. Lett., Vol. 33, pp. 58–59 (1997)). By varying a quantity of electric current fed to DBR regions 32, the oscillation wavelength can be varied.

On the other hand, the optical-waveguide-type SHG element 33 as a wavelength converting device may include an optical waveguide 34 that is provided on an X-cut MgO-doped LiNbO$_3$ substrate and cyclically-provided domain inverted regions 35. The optical waveguide 34 may be formed by proton exchange in pyrophosphoric acid. Furthermore, the cyclically-provided domain inverted regions 35 may be formed by forming a comb-shape electrode on an X-cut substrate and applying an electric field thereto.

In the case of a laser output of 100 mW, a laser beam of 60 mW is coupled with the optical waveguide 34. A quantity of electric current fed to the DBR regions 32 of the tunable DBR semiconductor laser 30 is controlled so that the oscillation wavelength is fixed within an allowable range of the phase matching wavelength of the optical-waveguide-type SHG element 33. Blue light with a wavelength of 425 nm with a power of about 10 mW may be used.

Here, a 0.01 $\mu$m thick Ta film is formed by vapor deposition on the optical waveguide 34 and is patterned, so that a heater electrode 36 is formed. The temperature of the optical waveguide 34 was changed by flowing current through the heater electrode 36, so that the phase matching wavelength was controlled. The quantity of current fed to the DBR regions 32 was controlled according to a change in the phase matching wavelength of the optical-guide-type SHG element 33, and during the wavelength tuning also, a certain level of blue light output was obtained. In an experiment, a wavelength tuning of 2 nm was obtained with respect to a temperature change of 30° C. in the waveguide, with which it was confirmed that the optical information recording/reproducing device was capable of coping with a temperature change of the hologram medium 5a at a level of ±25° C.

In the optical information recording/reproducing device according to the present invention, in the case where the light source wavelength is deviated to be longer, a differential signal obtained by subtracting an output of a photoreceptor cell 62e from an output of a photoreceptor cell 62i is positive. Here, the wavelength of the tunable coherent light source 18 is shifted to the shorter wavelength side by the wavelength control circuit 17 shown in FIG. 2. More specifically, for instance, in the case where the tunable coherent light source 18 shown in FIG. 4 is used, the wavelength control circuit 17 controls electric current supplied to the DBR regions 32 and the heater electrode 36. In the case where the foregoing differential signal is positive, both the electric current supplied to the DBR region 32 and that supplied to the heater electrode 36 are reduced, whereby the wavelength of the output light from the tunable coherent light source 18 is shifted to the shorter wavelength side.

Thus, the QPM-SHG device in which a tunable semiconductor laser and a wavelength converting device are combined is capable of changing the wavelength readily only through the supply of electric current and without mechanical actions. Therefore, it is useful particularly to make the optical information recording/reproducing device of the present invention compact and low-cost. Further, the QPM-SHG device has useful characteristics for hologram recording, such as less astigmatism, less relative noise field intensity, and high coherence.

It should be noted that in the optical information recording/reproducing device of the present invention, it is desirable to use a tunable coherent light source that emits light in the visible light range, from the viewpoint of the recording capacity and the stability of the recording medium. An SHG device using an infrared DBR laser is taken as an example of a light source that satisfies the conditions, but a DBR laser alone, without a tunable element, may be used as a light source. In the present situation, only DBR lasers with wavelengths in the infrared range have been developed, but in the case where DBR lasers with shorter wavelengths are developed in future, they will be useful light sources for the present invention.

Figure 5:
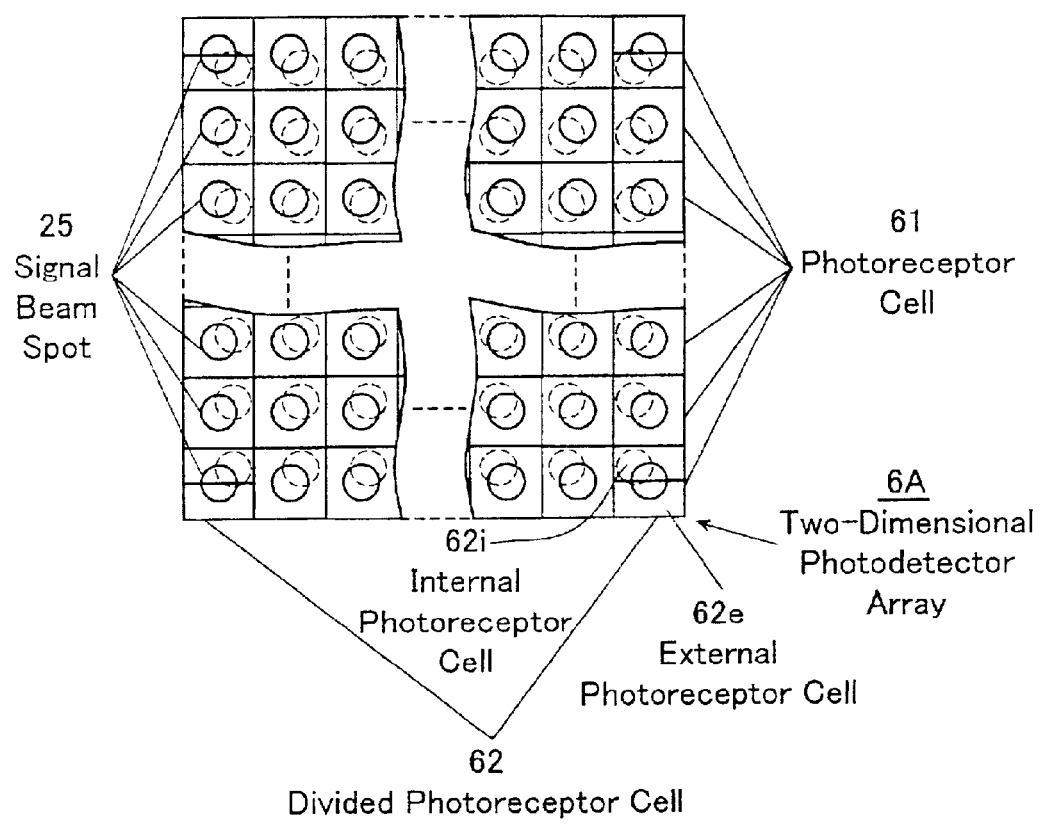
FIG. 5 is a view illustrating another example of a configuration of the two-dimensional photodetector array in the foregoing holographic optical information recording/reproducing device.
Figure 6:
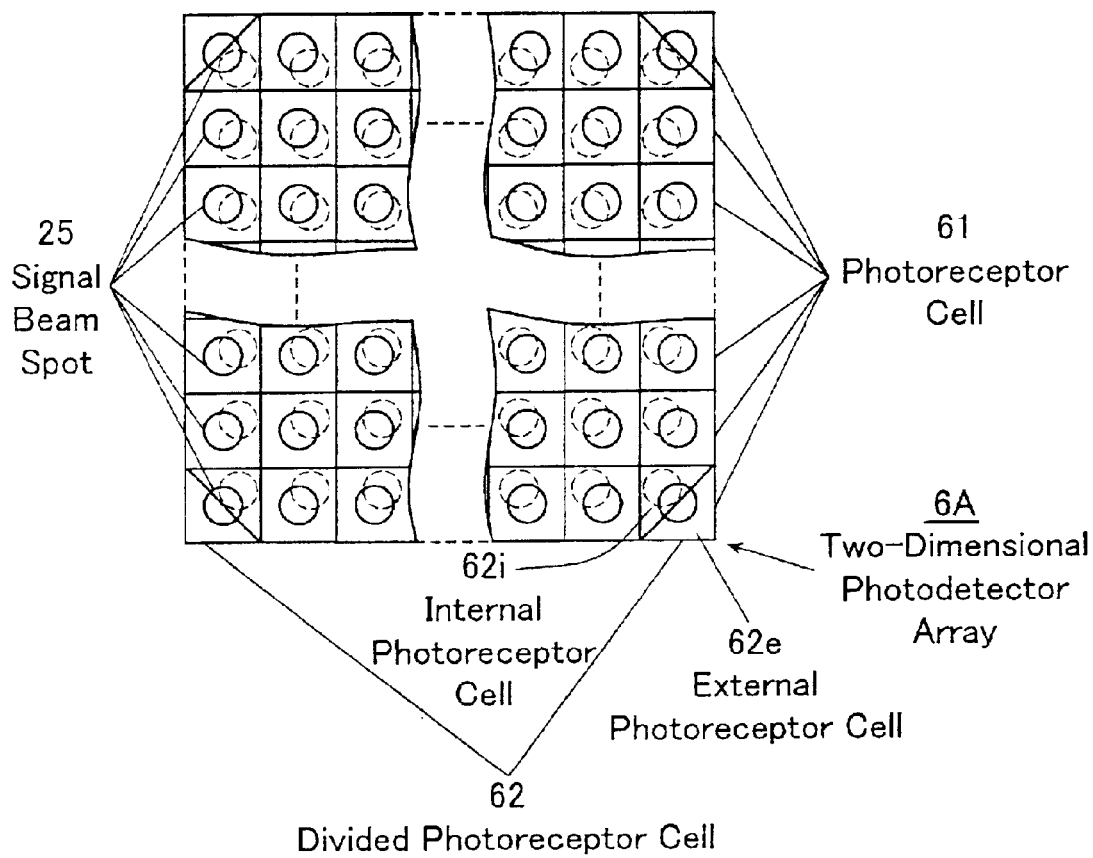
FIG. 6 is a view illustrating still another example of a configuration of the two-dimensional photodetector array in the foregoing holographic optical information recording/reproducing device.

It should be noted that division pattern of the light receptor cells 62 in the two-dimensional photodetector array 6 is not limited to the example shown in FIG. 3, and it may be a division pattern as that shown in FIG. 5 or 6. In the case of the division pattern shown in FIG. 6 is adapted, an advantage of undergoing a minimum of expansion/reduction of a reproduction pattern due to defocusing is achieved. Further, the number of divisions of the photoreceptor cell 62 is not limited to 2, but may be 3, 4, or above.

Second Embodiment

Figures 7A, 7B:
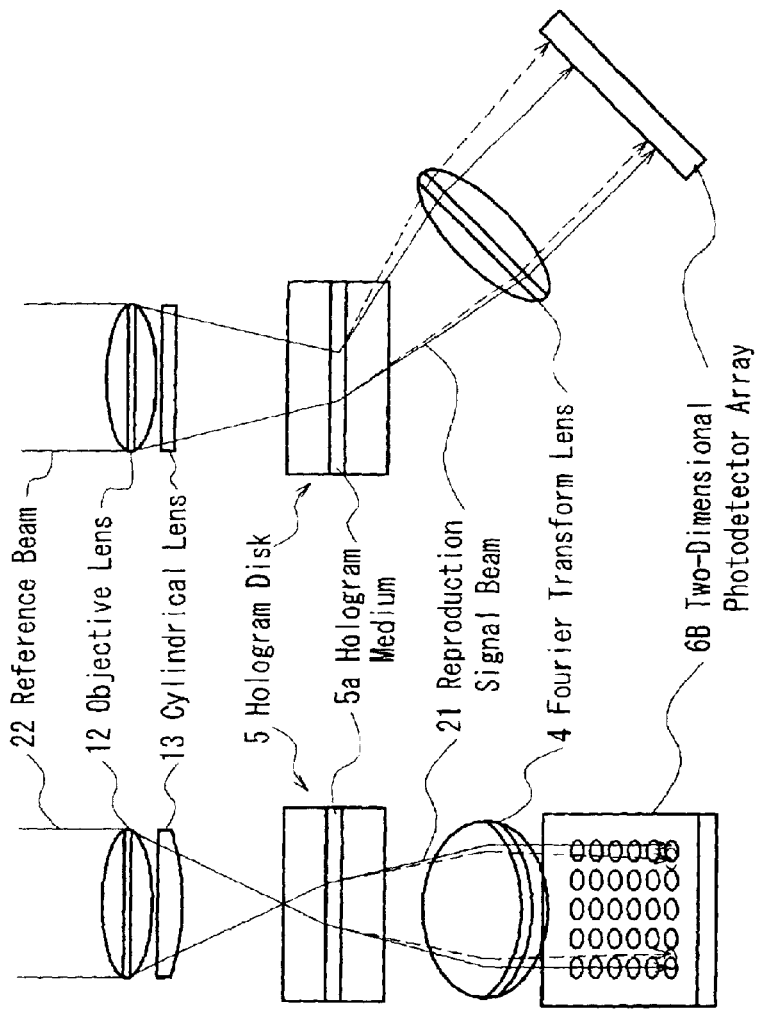
FIGS. 7A and 7B illustrate a schematic configuration of a holographic optical information recording/reproducing device according to a second embodiment.

An optical information recording/reproducing device according to the second embodiment shown in FIGS. 7A and 7B is configured so as to be capable of detecting a deviation of the light source wavelength as well as a focusing deviation of the reference beam at the same time. FIG. 7B illustrates a cross-sectional view of an optical system taken along a plane containing the reproduction signal beam 21 and the reference beam 22, that is, along a plane parallel with the direction in which the reproduction signal beam 21 is diffracted mainly (main diffraction direction). FIG. 7A is a view of the optical system that is viewed from the left side viewed in FIG. 7B and that partially is cross-sectional along a plane perpendicular to the plane containing the reproduction signal beam 21 and the reference beam 22.

The configuration shown in FIGS. 7A and 7B is characterized in that a cylindrical lens 13 is provided below an objective lens 12 for converging reference beam 22, that is, the reference beam enters a hologram medium via an anamorphic optical system. The cylindrical lens 13 causes the reference beam 22 to enter the hologram medium 5a as light that is diffused as viewed in a cross section perpendicular to the main diffraction direction (FIG. 7A), and is converged as viewed in a cross section parallel to the main diffraction direction (FIG. 7B). In FIGS. 7A and 7B, reproduction signal beam 21 reproduced according to reference beam 22 having an optimal wavelength is indicated with solid lines, and reproduction signal beam 21 reproduced according to reference beam 22 having a wavelength slightly longer than the optimal wavelength is indicated with broken lines. In the case where the reference beam 22 has a longer wavelength, the diffraction angle increases as compared with the reproduction at the optimal wavelength. Therefore, as shown in the drawings, a reproduced image is reduced in the direction perpendicular to the main diffraction direction while it is enlarged in the main diffraction direction.

Figure 8:
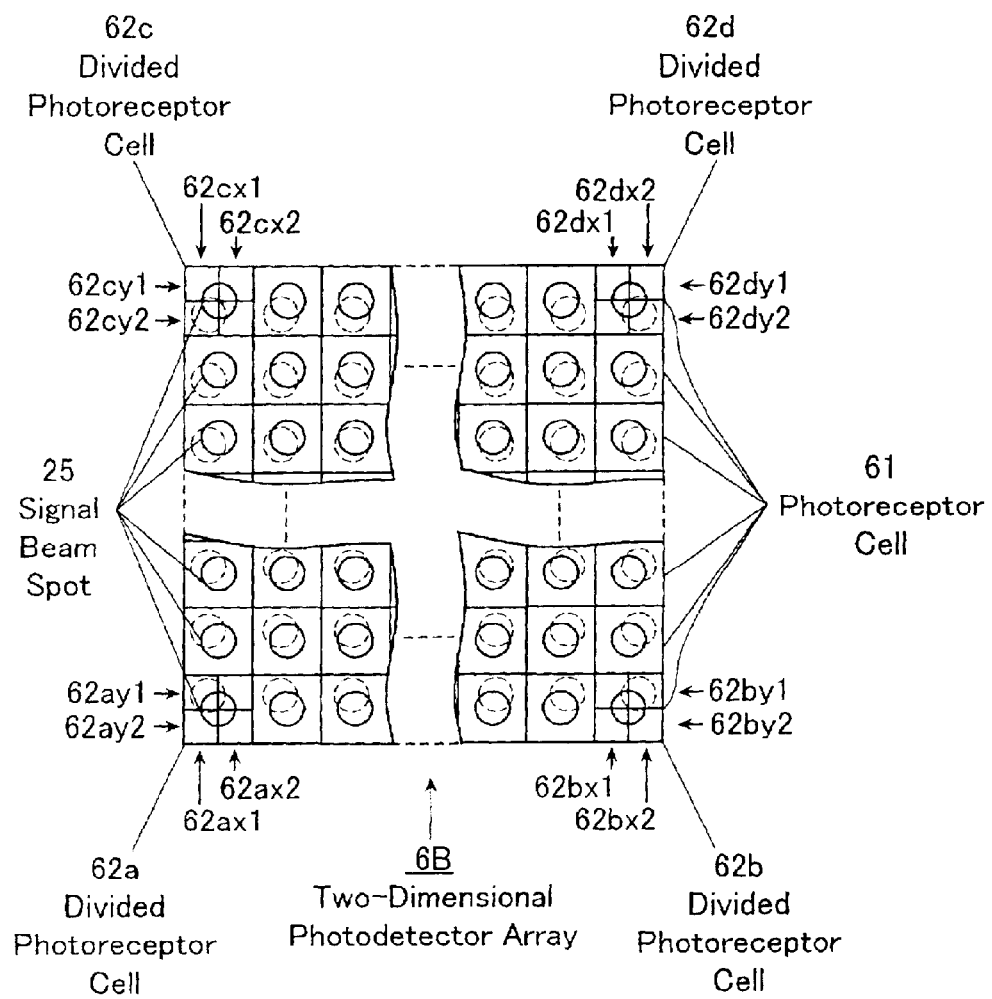
FIG. 8 is a view illustrating a received light pattern on a two-dimensional photodetector array in the device shown in FIGS. 7A and 7B.

The foregoing method is characterized in that focusing deviations and wavelength deviations of the objective lens 12 and the Fourier transform lens 4 are detected independently. More specifically, in the case where positions of the objective lens 12 and the Fourier transform lens 4 are shifted in the focusing direction, a magnification of the detecting optical system changes, thereby changing a size of the reproduced image on a two-dimensional photodetector array 6B. The configuration shown in FIG. 1 is incapable of detecting the change in the magnification and the change in the reproduction wavelength independently, whereas the configuration shown in FIGS. 7A and 7B is capable of detecting a change in the magnification and a change in the wavelength independently, according to a change in the size of an image and a difference in a received light pattern in the x direction and the y direction, respectively. A received light pattern on the two-dimensional photodetector array 6B in the case of the configuration shown in FIGS. 7A and 7B is shown in FIG. 8. It should be noted that a PD array, a CCD element, or the like may be used as the two-dimensional photodetector array 6B.

FIG. 8 illustrates an example in which four photodetector cells 62a, 62b, 62c and 62d on the four corners of the two-dimensional photodetector array 6B are divided, into four upper/lower right/left regions each. Based on output signals from the four regions, a sum of outputs from two divisions on the left side shown in FIG. 8 is defined to be 62ax1, a sum of outputs from two divisions on the right side is defined to be 62x2, a sum of outputs from two divisions on the upper side is defined to be 62ay1, and a sum of outputs of two divisions on the lower side is defined to be 62ay2. As to the divided photoreceptor cells 62b, 62c, and 62d, output signals are defined likewise. Herein, a quantity of a shift of a beam spot caused by a deviation of the wavelength is detected according to a signal obtained by calculating:

(62*ax*1−62*ax*2)+(62*ay*1−62*ay*2)+(62*bx*2−62*bx*1)+(62*by*1−62*by*2)+(62*cx*1−62*cx*2)+(62*cy*2−62*cy*1)+(62*dx*2−62*dx*1)+(62*dy*2−62*dy*1).

Furthermore, a change of the magnification of the detecting system or the reference optical system is detected according to a signal obtained by calculating:

(62*ax*1−62*ax*2)+(62*ay*2−62*ay*1)+(62*bx*2−62*bx*1)+(62*by*2−62*by*1)+(62*cx*1−62*cx*2)+(62*cy*1−62*cy*2)+(62*dx*2−62*dx*1)+(62*dy*1−62*dy*2).

It should be noted that a shift of the beam spot due to a wavelength deviation can be detected by a method described below. Namely, since the direction of the shift of the beam spot due to a wavelength deviation is a diagonal direction of a photoreceptor cell, by detecting a differential signal according to output signals from two division regions positioned diagonally among the four division regions of the photoreceptor cell, only a component resulting from the wavelength deviation is detected among deviations of the beam spot. For instance, in the case of the photoreceptor cell 62a shown in FIG. 8, a quantity of a shift of the beam spot due to a wavelength deviation can be detected according to a signal obtained by subtracting an output of a right lower region from an output of a left upper region.

Figure 9:
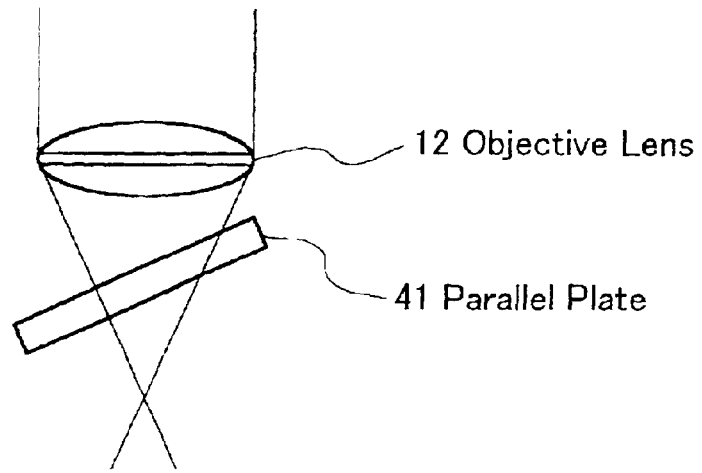
FIG. 9 is a view illustrating another example of an anamorphic optical system useful in the holographic optical information recording/reproducing device according to the second embodiment.
Figures 10A, 10B:
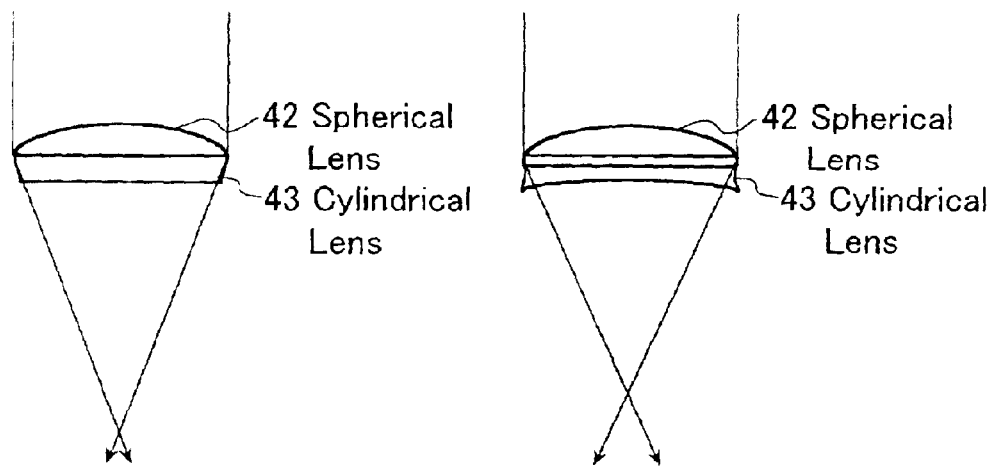
FIGS. 10A and 10B illustrate still another anamorphic optical system useful in the holographic optical information recording/reproducing device according to the second embodiment.

Furthermore, FIG. 7 illustrates an example in which a cylindrical lens 13 is used as an anamorphic optical system, but the same effect can be achieved with, instead of the cylindrical lens 13, a configuration in which a parallel plate 41 is disposed below the objective lens 12 so as to be tilted toward a direction parallel with the main diffraction direction as illustrated in FIG. 9. Further, an anamorphic optical system may be formed by, instead of the objective lens 12, a spherical lens 42 in combination with a cylindrical lens 43, as shown in FIGS. 10A and 10B. It should be noted that FIG. 10A is a cross-sectional view taken in a direction perpendicular to the main diffraction direction, and that FIG. 10B is a cross-sectional view taken in a direction parallel to the main diffraction direction.

Third Embodiment

The following description will depict still another embodiment of the present invention.

Figure 11:
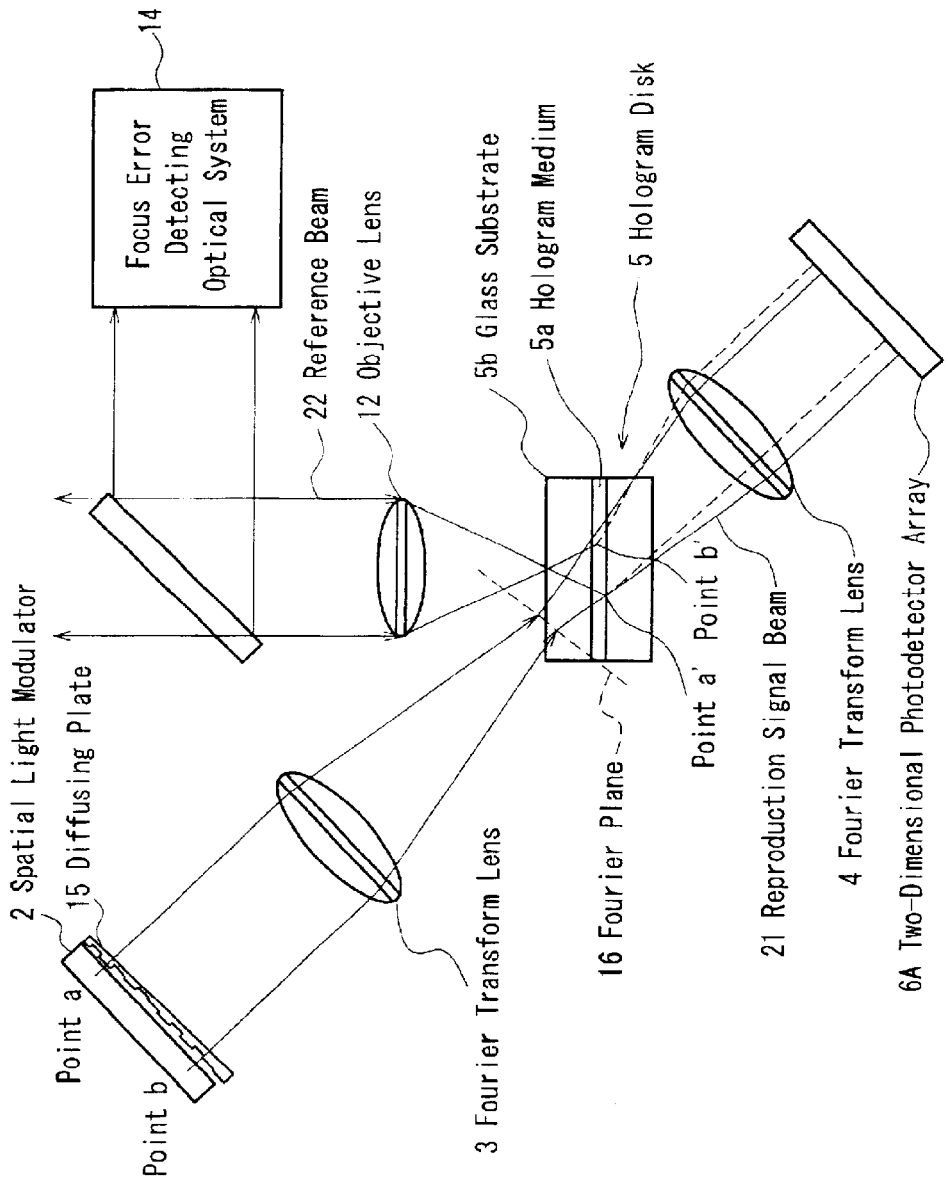
FIG. 11 is a view illustrating a schematic configuration of a holographic optical information recording/reproducing device according to a third embodiment.
Figure 12:
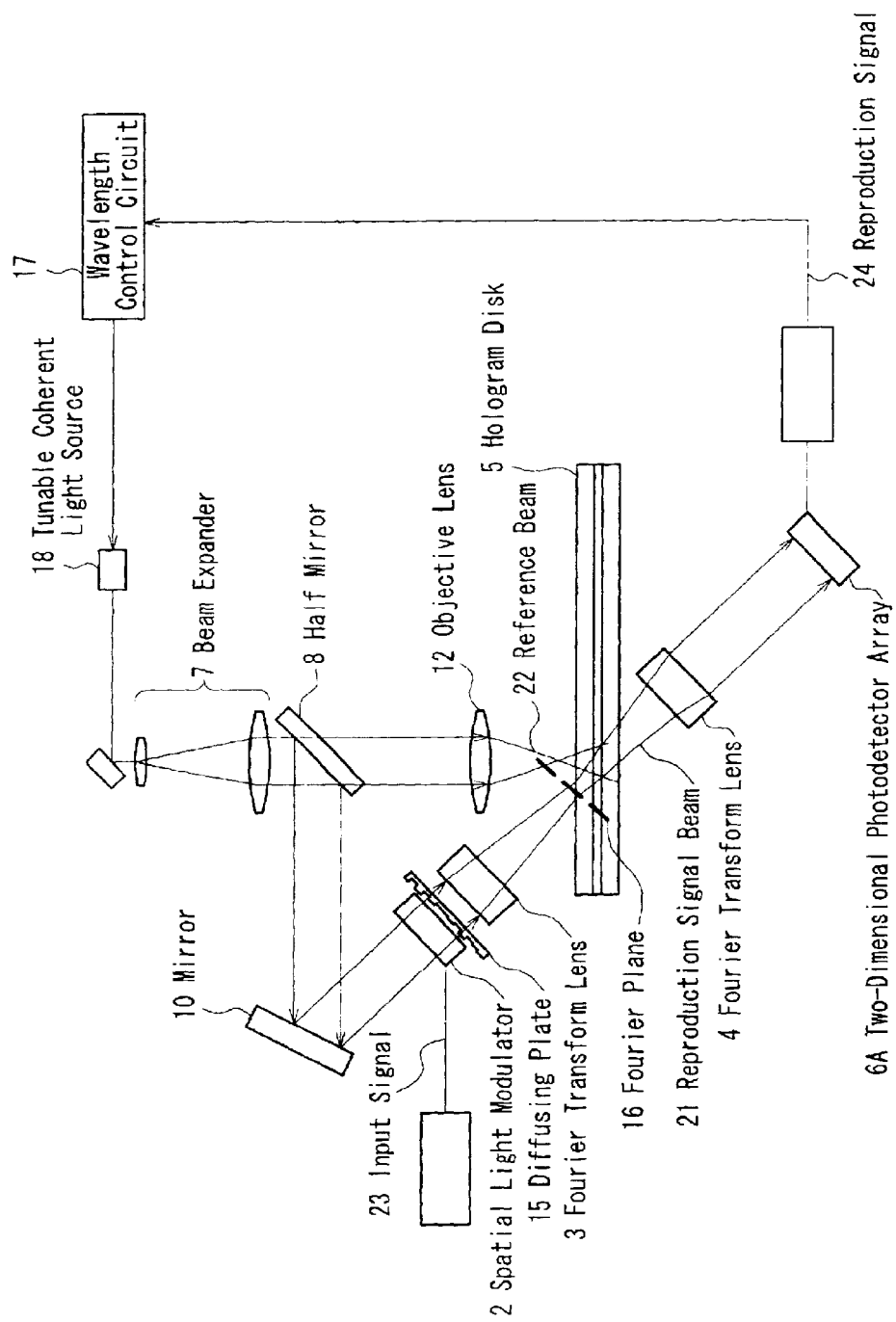
FIG. 12 is a view illustrating an overall configuration of the holographic optical information recording/reproducing device according to the third embodiment.

As technological challenges to be addressed in the hologram reproduction, the suppression of speckle noise is important, as well as the aforementioned wavelength control that the foregoing embodiments attempt to provide. The speckle noise stems mainly from defects such as dust and scars on a medium. In the case of the configuration shown in FIG. 1, light having passed through the spatial light modulator 2 is projected on the hologram medium 5a so that a light quantity distribution of 1:1 is achieved on the spatial light modulator 2. Therefore, if the hologram medium 5a has a defect or the like thereon, an image of the defect is projected on the two-dimensional photodetector array 6A, so that a received light pattern of diffracted light thereon includes an image of a defect, which is observed as a significant noise. Therefore, accurate signal reproduction cannot be carried out. A configuration according to the present embodiment for avoiding this problem is shown in FIGS. 11 and 12. As shown in FIGS. 11 and 12, an optical information recording/reproducing device according to the present embodiment is provided with a diffusing plate 15 in close proximity to the spatial light modulator 2. It should be noted that the diffusing plate 15 preferably is provided in contact with the spatial light modulator 2.

The diffusing plate 15 is obtained by, for instance, forming projections and depressions on a glass surface by etching, so as to provide a two-dimensional phase distribution to light that passes therethrough. The light thus provided with a phase distribution by the diffusing plate 15 has a finite dispersion on the Fourier plane 16. Therefore, light having passed through a certain point on the spatial light modulator 2 is recorded in a certain area on the hologram medium 5a. In this case, even if a defect is produced on the hologram medium 5a, the defect is not projected on the two-dimensional photodetector array 6A, but only reduces the total S/N of an image. The suppression of speckle noises by using the diffusing plate has been proposed conventionally, as depicted by Y. Nakayama and M. Kato, "Diffuser with Pseudorandom Phase Sequences", J. Opt. Soc. Am., Vol. 69, pp. 1367–1372, October 1979. The present embodiment differs from the conventional technique utilizing a diffusing plate in the following aspects.

In the case where the same phase shifts are provided to all the cells of the spatial light modulator 2, light from all the cells irradiates the same portion of the hologram medium 5a. Therefore, an effect is lost that light from specific cells is provided with different diffraction angles at different portions of the hologram medium, and a wavelength deviation is detected according to a change in the diffraction angle, as shown in the first or second embodiment. To avoid this, in an optical information recording/reproducing device of the present embodiment, cells of the diffusing plate corresponding to specific cells in the periphery of the spatial light modulator 2 are enlarged.

Figure 13:
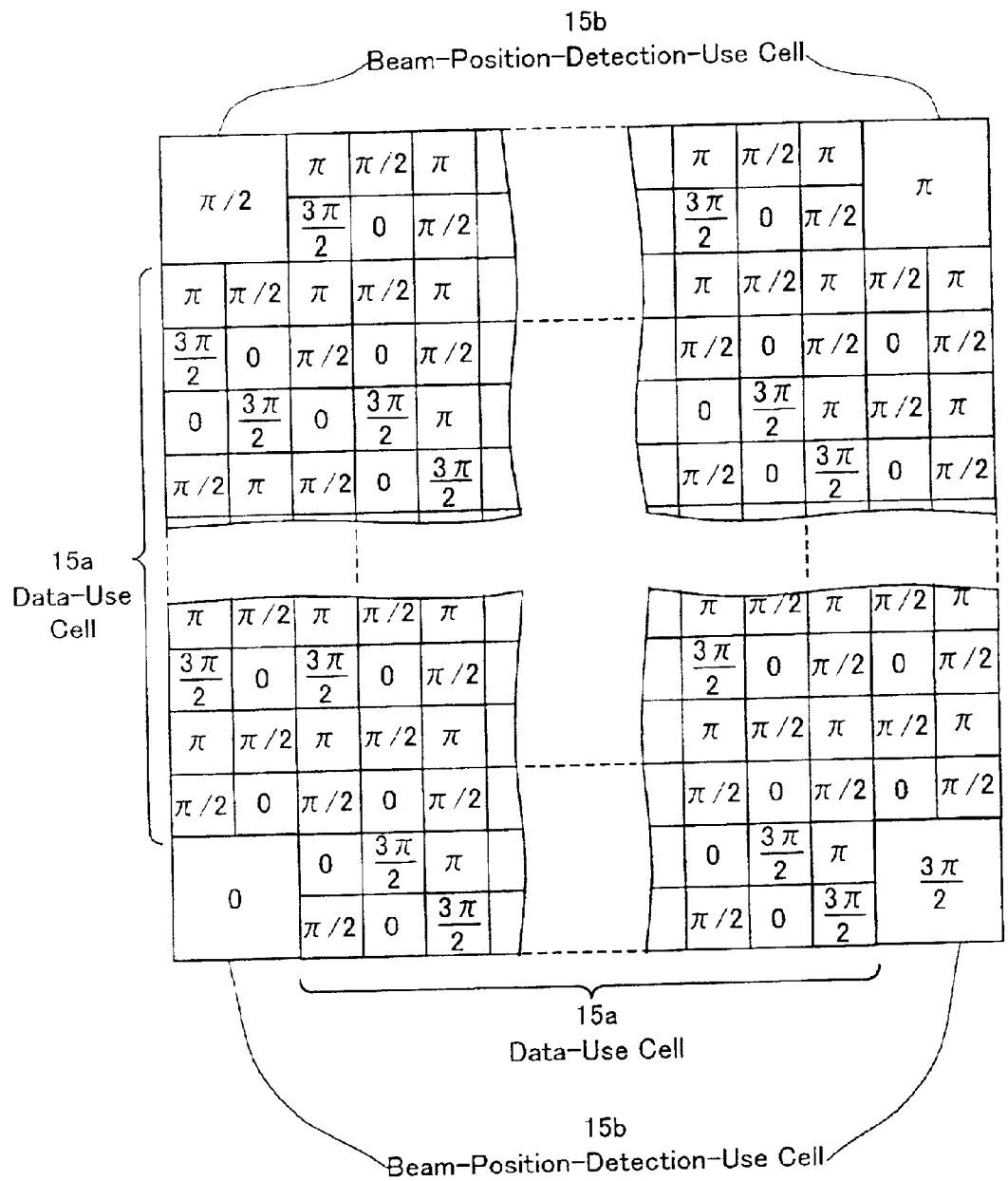
FIG. 13 is a schematic plan view of a diffusing plate in the holographic optical information recording/reproducing device according to the third embodiment.

A plan view of an example of the diffusing plate 15 is illustrated in FIG. 13. FIG. 13 illustrates how cells are provided in the diffusing plate and a quantity of a phase shift given in each cell. Data-use cells 15a are provided in two-dimensional square grid, which are given with phase shifts of 0, $\pi/2$, $\pi$, and $3\pi/2$, respectively. A phase difference between adjacent cells is either $\pi/2$ or $3\pi/2$. A length of one side of each cell is equal to that of a cell of the spatial light modulator 2, or about ¼ to ½ of the same. Since the beam is diffused at a diffusion angle inversely proportional to the size of a cell, a greater effect of the noise suppression is achieved as the cell is reduced in size, but this causes the size of a hologram to increase, thereby reducing the recording density. Beam-position-detection-use cells 15b corresponding to beams for detecting a wavelength deviation are larger in size than the data-use cells 15a. Therefore, beams passing therethrough become more like plane waves, and travel straight without being diffused. Therefore, a plurality of the position-detection-use beams having passed through the large cells irradiate different positions from each other, without spreading widely on the hologram medium 5a. Consequently, the aforementioned wavelength detection function can be achieved. By using such a new configuration of a diffusing plate, both functions of the speckle noise suppression and the beam position detection can be achieved at the same time.

FIG. 13 illustrates a phase pattern in which phase differences between adjacent cells are limited, but the same effect can be achieved with a random diffusing plate that provides phase shifts to cells at random. However, in the latter case, an intensity distribution is produced in light passing through the cells, thereby decreasing the S/N ratio of reproduction signals.

It should be noted that a diffusing plate divided into cells is shown as a specific example of a means for providing a two-dimensional phase distribution to signal light on a spatial light modulating element, but apart from this, a frosted-glass-like diffusing plate having random recesses and projections on its surface may be used.

The configuration of the optical information recording/reproducing device of the present invention permits to control a light source wavelength so as to optimize the same, by detecting a change of the optimal light source wavelength according to a variance of a recording medium and a change of the temperature of a recording medium. Therefore, the optical information recording/reproducing device ensures a signal intensity against the foregoing change, and this enables stable signal reproduction.

Another configuration of the optical information recording/reproducing device of the present invention in which an anamorphic optical system is used for producing a reference beam is capable of detecting a change in a magnification of a reproduction optical system or that of a reference beam optical system separately from the detection of the change of the optimal wavelength. Therefore, the optical information recording/reproducing device ensures a signal intensity against both the changes, and this enables stable signal reproduction.

Still another configuration of the optical information recording/reproducing device of the present invention in which a diffusing plate is used is capable of detecting the change of the optimal wavelength, while suppressing speckles noise in reproduction signals effectively. This enables stable reproduction.

According to still another configuration of the optical information recording/reproducing device of the present invention in which a QPM-SHG light source, a tunable coherent light source, can be configured simply. Therefore, a compact and low-cost optical information recording/reproducing device can be provided.

The invention may be embodied in other forms without departing from the spirit or essential characteristics thereof. The embodiments disclosed in this application are to be considered in all respects as illustrative and not limiting. The scope of the invention is indicated by the appended claims rather than by the foregoing description, and all changes which come within the meaning and range of equivalency of the claims are intended to be embraced therein.

What is claimed is:

1. A holographic optical information recording/reproducing device that projects a reference coherent beam to a recording medium and receives a reproduction signal beam obtained by diffraction of the reference coherent beam at the recording medium by means of a two-dimensional photodetector array so as to reproduce from the reproduction signal beam digital data recorded in a form of interference fringes produced by two coherent beams on the recording medium, the holographic optical information recording/reproducing device comprising:

a tunable coherent light source that emits the reference coherent beam; and a control section that, when reproducing the digital data from the reproduction signal beam, reads a position information of the reproduction signal beam on the two-dimensional photodetector array, the position information varying in accordance with a wavelength of the tunable coherent light source, and controls a wavelength of the tunable coherent light source according to the position information.

2. The holographic optical information recording/reproducing device according to claim 1, wherein at least one photoreceptor cell of the two-dimensional photodetector array is divided into not less than two regions, at least a part of the reproduction signal beam is made incident on the regions of the divided photoreceptor cell so as to be used as a servo-use beam, and the control section detects the position information according to a differential signal derived from signals obtained at the respective region by the servo-use beam.

3. The holographic optical information recording/reproducing device according to claim 2, wherein recording is carded out so that the servo-use beam of the reproduction signal beam is in an ON state constantly.

4. The holographic optical information recording/reproducing device according to claim 2, wherein recording is carried out so that the servo-use beam of the reproduction signal beam is in an ON state at a higher probability as compared with the other beam spots.

5. The holographic optical information recording/reproducing device according to claim 2, wherein the divided photoreceptor cells are positioned at four corners of the two-dimensional photodetector array.

6. The holographic optical information recording/reproducing device according to claim 1, further comprising:

an anamorphic optical system through which the coherent beam passes, wherein the control section detects a position deviation of the coherent beam in a focusing direction and a wavelength deviation of the tunable coherent light source independently, according to changes in a reproduced image detected by the two-dimensional photodetector array.

7. The holographic optical information recording/reproducing device according to claim 1, further comprising:

a beam splitter for dividing the coherent beam emitted from the tunable coherent light source into two beams that are a signal beam and a reference beam;

a spatial light modulator for modulating an intensity of the signal beam two-dimensionally;

an element for imparting a two-dimensional phase distribution to the signal beam on the spatial light modulator, the element having a greater coherence length in its peripheral region than in its central region; and an optical system for crossing the signal beam and the reference beam on the recording medium.

8. The holographic optical information recording/reproducing device according to claim 7, wherein the element for imparting a two-dimensional phase distribution includes cells that are arranged in a two-dimensional square grid and that have phase shifts of any one of $0$, $\pi/2$, $\pi$, and $3\pi/2$, and a phase difference between adjacent cells is either $\pi/2$ or $3\pi/2$.

9. The holographic optical information recording/reproducing device according to claim 1, further comprising a lens system for focusing diffracted light from the recording medium into the two-dimensional photodetector array, wherein the recording medium is disposed at a position different from a focus of the lens system.

10. The holographic optical information recording/reproducing device according to claim 1, wherein the tunable coherent light source is a coherent light source utilizing a tunable semiconductor laser and a second-harmonic generation element.

* * * * *